United States Patent [19]

Moog

[11] Patent Number: 4,685,813
[45] Date of Patent: Aug. 11, 1987

[54] HYDROSTATIC BEARING
[75] Inventor: William C. Moog, East Aurora, N.Y.
[73] Assignee: Moog Inc., East Aurora, N.Y.
[21] Appl. No.: 891,194
[22] Filed: Jul. 28, 1986
[51] Int. Cl.[4] .............................................. F16C 32/06
[52] U.S. Cl. .................................... 384/118; 384/123; 384/448
[58] Field of Search ............... 384/118, 123, 448, 111, 384/121, 112, 107, 100

[56] References Cited

U.S. PATENT DOCUMENTS

| | | | |
|---|---|---|---|
| 3,129,037 | 4/1964 | Ott | 384/118 |
| 4,371,216 | 2/1983 | Suzuki et al. | 384/118 |
| 4,417,823 | 11/1983 | Drevet et al. | 384/111 |
| 4,514,099 | 4/1985 | John et al. | 384/118 |

Primary Examiner—Lenard A. Footland
Attorney, Agent, or Firm—Sommer & Sommer

[57] ABSTRACT

A hydrostatic bearing is provided between two relatively movable members. Opposing sensing and bearing pads extend into either member and face the other member. These pads communicate with one another. An inlet orifice is defined between the members and extends from a fluid source to the sensing pad. An outlet orifice is defined between the members and extends from the bearing pad to the fluid return. The areas of the inlet and outlet orifices vary reciprocally in the sense that as one area increases, the other area decreases. The bearing exhibits reduced flow characteristics when one member moves axially and/or radially relative to the other member.

36 Claims, 11 Drawing Figures

HYDROSTATIC BEARING

BACKGROUND OF THE INVENTION

1. Field of the Invention

The present invention relates generally to the field of hydrostatic bearings, and, more particularly, to an improved hydrostatic bearing which exhibits reduced leakage characteristics when one member moves (e.g., axially and/or rotatively) relative to another member.

2. Description of the Prior Art

Hydrostatic bearings are, of course, known. Many of these have a recentering feature, which creates an increased force urging an out-of-position member back to a centered position relative to another member.

For example, in one form which was provided between a shaft and a body, pressurized fluid was caused to flow sequentially through a fixed inlet orifice to a bearing pad or recess, and thence through a variable outlet orifice to a fluid return. The area of the outlet orifice was a function of the extent of radial eccentricity between the body and the shaft. If the shaft moved in one radial direction so as to reduce the area of the outlet orifice, flow through the bearing would be reduced. However, if the bearing moved in the opposite radial direction so as to increase the area of the outlet orifice, flow through the bearing would be increased.

SUMMARY OF THE INVENTION

The present invention provides an improved hydrostatic bearing which is adapted to be operatively arranged between relatively-movable first and second members. The improvement broadly comprises: a sensing pad extending into one of the members and arranged to face the other of the members; a bearing pad extending into the one member at a location opposed to the location of the sensing pad and arranged to face the other member, the projected area of the bearing pad being greater than the projected area of the sensing pad; a passageway communicating the sensing and bearing pads so as to equalize the pressures therein; a fluid source at a relatively-high supply pressure; a fluid return at a relatively-low return pressure; a variable inlet orifice defined between the members and extending from the source to the sensing pad; a variable outlet orifice defined between the members and extending from the bearing pad to the return; the orifices being so dimensioned and proportioned that when the first member is in a predetermined position relative to the second member, the pressure drop across the inlet orifice will be substantially equal to the pressure drop across the outlet orifice; whereby, if the first member moves from the predetermined position toward the second member such that the spacing between the sensing pad and the other member decreases, the pressure in the pads and passageway will increase to exert an increased net force which urges the first member to move back toward the predetermined position.

Accordingly, the general object of the invention is to provide an improved hydrostatic bearing.

Another object is to provide an improved hydrostatic bearing which exhibits reduced leakage characteristics when one member moves away from a predetermined position relative to another member.

These and other objects and advantages will become apparent from the foregoing and ongoing written specification, the drawings, and the appended claims.

BRIEF DESCRIPTION OF THE DRAWINGS

FIG. 4b is a fragmentary transverse vertical sectional view thereof, taken generally on line 4b—4b of FIG. 4a.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. § 112. As used in the following description, the terms "horizontal", "vertical", "left", "right", "up" and "down", as well as adjectival and adverbial derivatives thereof (e.g., "horizontally", rightwardly", "upwardly", etc.), simply refer to the orientation of the illustrated structure as the particular drawing figure faces the reader. Similarly, the terms "inwardly" and "outwardly" refer to the orientation of a surface relative to its axis of elongation, or axis of rotation, as appropriate.

Referring now to the drawings, the present invention provides an improved hydrostatic bearing which may be operatively arranged between two relatively-movable members. In a first form of the improved bearing, shown in FIGS. 2a and 2b, the penetrant member is movable axially and/or rotatively relative to the body, and the pads and passageway are provided in the body. In a second form of the improved bearing, shown in FIGS. 4a and 4b, the improved bearing is arranged between a rotatable shaft and a stationary body, and the pads and passageway are provided in the shaft. In a third form, shown in FIGS. 5a–5c, the improved bearing is operatively arranged to resist thrust loads between a member and a body, while the member is also movable rotatively relative to the body.

However, before proceeding to a description of the structure and operation of the improved bearing, it is deemed advisable to review the structure and operation of a prior art bearing.

Figure 1A:
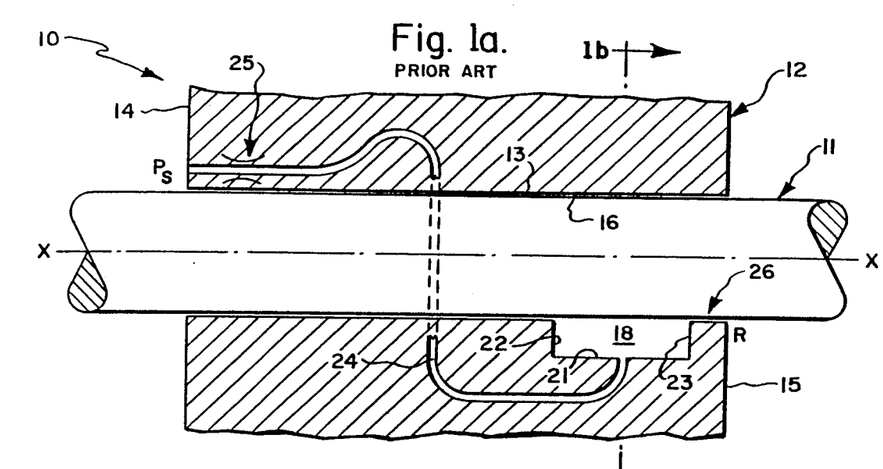
FIG. 1a is a schematic fragmentary vertical sectional view of a prior art hydrostatic bearing provided between a body and a penetrant portion of a rod, this view showing one bearing pad operatively positioned between a fixed inlet orifice and a variable outlet orifice.
Figure 1B:
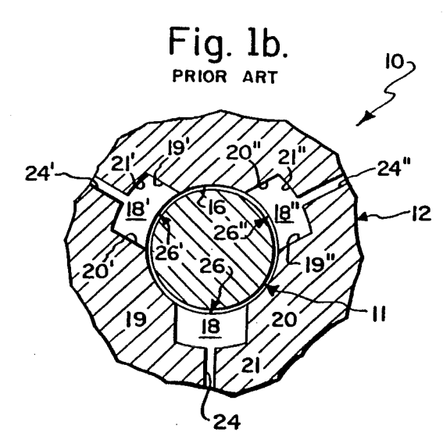
FIG. 1b is a fragmentary transverse vertical sectional view thereof, taken generally on line 1b—1b of FIG. 1a, and showing the three bearing pads as spaced equally about the rod.

PRIOR ART BEARING (FIGS. 1a–1b)

Referring now to FIG. 1a, a known hydrostatic bearing, generally indicated at 10, was provided between the penetrant portion of a rod 11 and a body 12.

The rod is illustrated as being a horizontally-elongated member having an outwardly-facing horizontal cylindrical surface 13 generated about axis x—x, and is mounted for horizontal and/or rotational sliding movement relative to the body.

The body 12 had a vertical left wall 14, a vertical right wall 15, and a horizontal through-opening, bounded by an inwardly-facing cylindrical surface 16, extending therebetween. Body left wall 14 faced into a chamber containing a source of pressurized fluid at a relatively-high supply pressure $P_s$, while body right wall 15 faced into another chamber communicating with a fluid return at a return pressure R.

As best shown in FIG. 1b, three circumferentially-spaced bearing pads, individually indicated at 18,18',18", extended substantially radially into the body from bore surface 16. Each of these pads was in the form of an axially-elongated slot-like circumferential recess bounded by longitudinally-extending side walls 19,19',19" and 20,20',20", bottom surfaces 21,21',21", and left and right end walls, respectively. Only the left and right end walls 22,23 of pad 18 appear in FIG. 1a, but the other pads were similarly configured.

A body passageway 24, containing a fixed restricted orifice 25, communicated body left face 14 with bearing pad 18. A variable orifice 26 was defined between facing cylindrical surfaces 13,16 and extended from bearing pad right end wall 23 to body right end face 15. Because surfaces 13,16 were closely spaced, and, further, because the other axial lengths (i.e., from left end face 14 to bearing surface 22, etc.) were relatively long, the path of least flow resistance was through variable outlet orifice 26. Thus, fluid could flow from the source through the fixed orifice 25, conduit 24, bearing pad 18, and variable orifice 26, to the return. Similarly, fluid could also flow independently from the source through the other fixed orifices 25',25" (not shown), the other passageways 24',24", the other bearing pads 18',18", and the other variable outlet orifices 26',26", respectively, to the return.

If shaft 11 moved radially relative to the axis of bore surface 16, the size of each variable orifice would be changed accordingly. For example, if shaft 11 moved downwardly, the area of lower orifice 26 would be decreased, while the areas of upper orifices 26',26" would be increased. Such downward movement of the shaft would cause the pressure in lower bearing pad 18 to increase, which created a net upward force which urged the shaft to move back to its centered or concentric position. Such increase of the pressure in pad 18, was accompanied by a corresponding decrease of the pressures in upper pads 18',18". On the other hand, if the shaft moved upwardly so as to increase the size of variable orifice 26, the pressure in lower bearing pad 18 was reduced. Such reduced pressure in pad 18, coupled with the increased pressures in pads 18',18", created a net downward force which urged the shaft to move downwardly back to its concentric position.

Thus, in this prior art embodiment, fluid was caused to flow sequentially through a fixed inlet orifice 25 and a variable outlet orifice 26. The bearing pad was operatively arranged between these two orifices such that the pressure $P_1$ in the bearing pad and passageway, was a function of the area of the outlet orifice 26, through which fluid would flow from the bearing pad to the return.

Figure 2A:
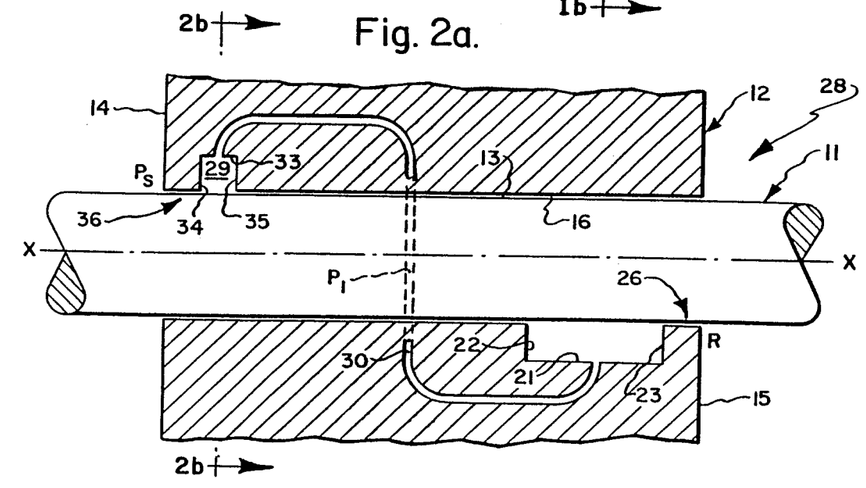
FIG. 2a is a schematic fragmentary vertical sectional view of a first form of the improved hydrostatic bearing, this view showing a sensing pad, a passageway and a bearing pad operatively positioned between the two variable orifices.
Figure 2B:
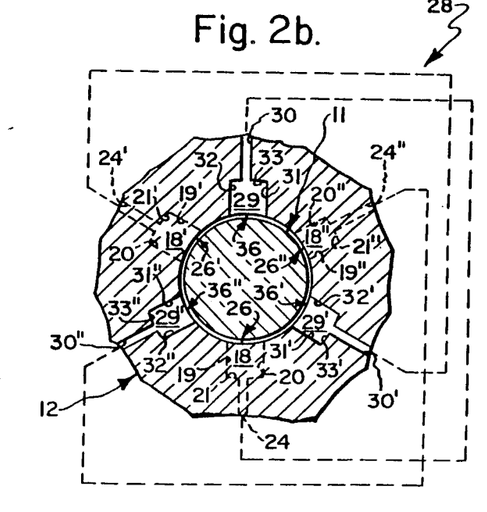
FIG. 2b is a fragmentary transverse vertical sectional view thereof, taken generally on line 2b—2b of FIG. 2a, and showing the three pairs of diametrically-opposite sensing and bearing pads as spaced equally about the rod.
Figure 2C:
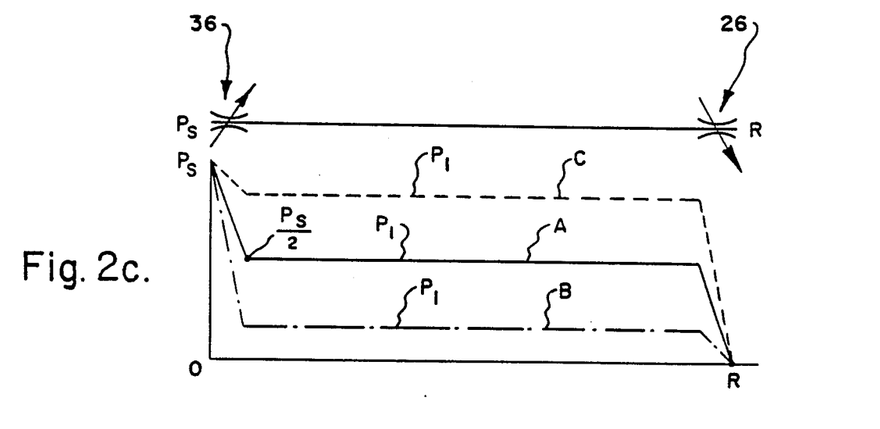
FIG. 2c is a graph of pressure as a function of axial position along the body for the improved bearing shown in FIGS. 2a-2b, and showing the pressure drops across the two orifices.

FIRST IMPROVED EMBODIMENT (FIGS. 2a–2c)

Referring now to FIGS. 2a–2c, a first embodiment of the improved hydrostatic bearing is generally indicated at 28.

The improved bearing is somewhat similar to the prior art bearing. Hence, to the extent possible, the same reference numerals have been used in FIGS. 2a and 2b to indicate like portions, elements or surfaces, previously described, with the additional description being confined to that structure by which the improved bearing differed from the prior art bearing.

The improved bearing is shown as having an axially-elongated rectangular sensing pad 29 extending upwardly into the body from cylindrical body surface 16, upstream of each associated bearing pad. The fixed orifices of the prior art embodiment have been eliminated, and passageway 30 is shown as communicating sensing pad 29 with the diametrically-opposite bearing pad 18 in FIG. 2a. As shown in FIG. 2b, there are three sensing pads 29,29',29", and three bearing pads 18,18',18", these being individually arranged in diametrically-opposite pairs, and three communicating passageways 30,30',30". The three sensing pads and the three bearing pads are spaced equally about surface 16. However, only sensing pad 29 and its paired bearing pad 18 appear in FIG. 2a. The circumferential widths (w) of the sensing pads are preferably the same as the circumferential widths (w) of the bearing pads, although this may be changed as desired. However, as may be readily seen from FIG. 2a, the axial length of the bearing pads is greater than the axial length of the sensing pads. Hence, the upwardly-facing projected area of bearing pad 18 is greater than the downwardly-facing projected area of opposing sensing pad 29, and the pressure $P_1$ in these two pads and the passageway exerts a net upward force on the shaft due to this differential area. Sensing pads 29,29',29" are shown as having longitudinal side walls 31,31',31" and 32,32',32", bottom surfaces 33,33',33", and left and right end walls, respectively. However, only end walls 34,35 appear in FIG. 2a.

In this embodiment, variable inlet orifices, severally indicated at 36,36', 36", are formed between facing cylindrical surfaces 13,16 and extend from body left face 14 to sensing groove surfaces 34,34',34". Outlet orifices 26,26',26" are again formed between facing cylindrical surfaces 13,16 and extend from bearing pad surfaces 23,23',23" to body right face 15. Thus, fluid may flow independently from the source through th inlet orifices 36,36',36" to enter sensing pads 29,29',29", then flow through passageways 30,30',30" to enter bearing pads 18,18',18", and then flow through outlet orifices 26,26',26", respectively, to the common return. Here again, the fluid pressure in the sensing and bearing pads, as well as in the intermediate passageway 30, is indicated as being $P_1$, with $P_1'$ and $P_1''$ being used to indicate such pressures in the other passageways.

Hence, in this first embodiment, each flow passageway has a variable-area inlet orifice (e.g., 36) arranged in series with a variable-area outlet orifice (e.g., 26). The areas of these paired orifices, 36 and 26, 36' and 26', 36" and 26", vary reciprocally in the sense that as the shaft moves radially, the area of one paired orifice will increase, while the area of the other paired orifice will decrease by a corresponding amount.

Referring now to FIG. 2c, the inlet and outlet orifices are preferably configured such that when shaft 11 is in a centered or concentric position relative to body surface 13, the pressure drop across the inlet orifice 36 will be substantially equal to the pressure drop across the paired outlet orifice 26, as indicated by curve A in FIG. 2c. However, if shaft 11 moves upwardly from such concentric position, the area of inlet orifice 36 will decrease, while the area of outlet orifice 26 will increase. In this situation, the pressure drop across the inlet orifice will be greater than the pressure drop across the outlet orifice, as schematically indicated by curve B in FIG. 2c. Conversely, if shaft 11 moves downwardly from such concentric position, the area of the inlet orifice will be increased, while the area of the outlet orifice will be decreased. Hence, in this situation, the pressure drop across the inlet orifice will be less than the pressure drop across the outlet orifice, as indicated by curve C in FIG. 2c.

Figure 3:
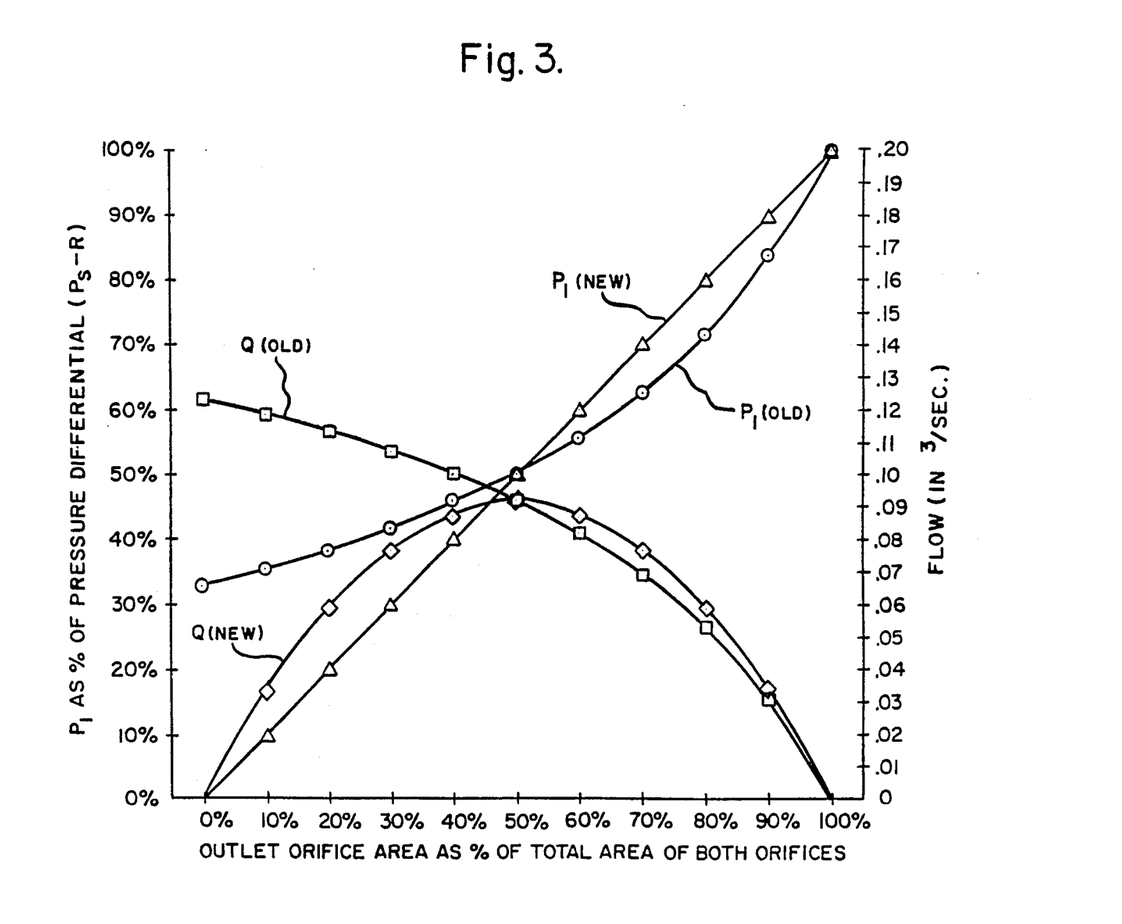
FIG. 3 is a graph comparing the performance of the prior art and improved bearings, this graph showing passageway pressure $P_1$ as a percentage of pressure differential $(P_s-R)$, and also showing bearing leakage as a function of radial shaft position expressed in terms of outlet orifice area $(A_2)$ as a percentage of total area of both orifices $(A_1+A_2)$.

The hydraulic performance of the embodiments shown in FIGS. 1a-1b and FIGS. 2a-2c, is comparatively illustrated in FIG. 3.

As previously indicated, in the prior art embodiment shown in FIGS. 1a-1b, each flow passageway had a fixed inlet orifice (e.g., 25) connected hydraulically in series with a variable-area outlet orifice (e.g., 26). The inlet orifice was either a sharp-edged orifice, which produced turbulent flow therethrough, or somewhat resembled a long capillary tube having a high length-to-diameter ratio so as to produce laminar flow therethrough. Thus, fluid flowed rightwardly from the source through each inlet orifice, the associated passageway 24 and bearing pad 18, and the associated outlet orifice 26, to the return. The fluid source was at supply pressure $P_s$, the return was at return pressure R, and the fluid between the orifices (e.g., in conduit 24 and bearing pad 18) was at some intermediate pressure $P_1$.

For comparative purposes, assume that each inlet orifice 25 was configured as a long restricted passage (i.e., having a large length-to-diameter ratio, so as to resemble a capillary tube), such that the flow therethrough was substantially laminar. The general equation for laminar flow (Q) through an orifice is:

$$Q = AC_dL(P_i - P_o)$$

where A is the area of the orifice through which fluid must flow, $C_d$ is the discharge coefficient per unit length, L is the length of the orifice, $P_i$ is the upstream pressure, and $P_o$ is the downstream pressure. Hence, the flow ($Q_1$) through the fixed inlet orifice, and the flow ($Q_2$) through the variable outlet orifice, could be calculated according to the equations:

$$Q_1 = A_1 C_d L_1 (P_s - P_1)$$

$$Q_2 = A_2 C_d L_2 (P_1 - R)$$

However, in steady state, the flows through the two orifices would necessarily be the same (i.e., $Q_1 = Q_2$). Hence, $$A_1 C_d L_1 (P_s - P_1) = A_2 C_d L_2 (P_1 - R)$$

If both orifices were configured to have the same length (i.e., $L_1 = L_2$), and if $P_s = 1000$ psi and $R = 0$, then this equation could be solved for $P_1$:

$$P_1 = 1000 A_1 / (A_1 + A_2)$$

where $A_1$ is the cross-sectional area of the fixed inlet orifice and $A_2$ is the cross-sectional area of the variable outlet orifice.

For purposes of illustration, assume that the fixed orifice had a narrowed diameter of, say, 0.020 inches. Hence, $A_1 = 0.000314$ in$^2$. Knowing this, the variable outlet orifice could be configured to have the same nominal area ($A_{2n}$) when the shaft was positioned concentrically. The outlet orifice area could be configured as an arcuate segment, somewhat resembling a rectangle, having a circumferential width (w) and a radial height (h). For example, if $w = 0.628$ in and if $h = 0.0005$ in, then $$A_{2n} = wh = (0.628)(0.0005) = 0.000314 \text{ in}^2$$

The actual area ($A_2$) of this variable outlet orifice may be expressed as a function of the polarity and magnitude of radial eccentricity:

$$A_2 = A_{2n} - wx = 0.000314 - 0.628x$$

where x is the radial distance between the respective axes of surfaces 13,16. Thus, when the shaft is in its concentric position, $x =$ and $A_2 = A_{2n}$. However, if the shaft were to move downwardly to an eccentric position (i.e., x is a positive value), then $A_2 < A_{2n}$. On the other hand, if the shaft were to move upwardly to an eccentric position (i.e., x is a negative value), then $A_2 > A_{2n}$. Substituting, $$P_1 = 1000 A_1 / [A_1 + (A_{2n} - wx)]$$

In this example, $A_1 = A_{2n} = 0.000314$ in$^2$. Hence, if $w = 0.628$ in, this equation can be simplified to:

$$P_1 = 0.314 / (0.000628 - 0.628x)$$

As previously indicated, the flow through the bearing may be calculated according to the equation:

$$Q = Q_1 = A_1 C_d L_1 (P_s - P_1)$$

where $C_d = 0.587$ in$^2$/sec lb. Thus, if both orifices have an axial length of one inch, the values of $P_1$ and $Q_1$ for various values of x, are summarized in Table I herebelow:

TABLE I

| Prior Art Bearing (FIGS. 1a–1b) | | |
|---|---|---|
| x (in) | $P_1$ (psi) | Q (in$^3$/sec) |
| −0.0005 | 333 | 0.123 |
| −0.0004 | 357 | 0.119 |
| −0.0003 | 384 | 0.113 |
| −0.0002 | 417 | 0.107 |
| −0.0001 | 454 | 0.100 |
| 0 | 500 | 0.092 |
| +0.0001 | 556 | 0.082 |
| +0.0002 | 625 | 0.069 |
| +0.0003 | 714 | 0.053 |
| +0.0004 | 833 | 0.031 |
| +0.0005 | 1000 | 0 |

This data is plotted in FIG. 3 in terms of dimensionless analogs of these quantities. Thus, pressure $P_1$ is expressed as a percentage of the differential pressure ($P_s - R$) across member 12, and radial eccentricity is expressed as outlet orifice area as a percentage of the total area of both orifices. From this, it may be seen that as the shaft moves downwardly so as to decrease the area of the variable outlet orifice, $P_1$ rises. The flow through the bearing is greatest when the outlet orifice area is greatest (i.e., x = −0.0005 in), and falls off as the shaft moves downwardly. Moreover, the pressure drop (i.e., $P_s - P_1$) across the inlet orifice will be equal to the pressure drop (i.e., $P_1 - R$) across the outlet orifice only when the shaft is in its concentric position (i.e., x=0).

The improved bearing, shown in FIGS. 2a–2c, has a variable-area inlet orifice 36 arranged hydraulically in series with a variable-area outlet orifice 26. Thus, fluid again flows from the source through the variable inlet orifice, the sensing pad, the passageway, the bearing pad, and the variable outlet orifice, to the return. However, in the improved bearing, when shaft 11 moves radially, the areas of the bearings vary reciprocally in the sense that as the area of one orifice increases, the area of the other orifice decreases by substantially the same amount. If flow through both orifices is laminar:

$$Q_1 = A_1 C_d L (P_s - P_1)$$

$$Q_2 = A_2 C_d L_2 (P_1 - R)$$

Since flow through the bearing is constant (i.e., $Q_1 = Q_2$), $$A_1 C_d L_1 (P_s - P_1) = A_2 C_d L_2 (P_1 - R)$$

If these two orifices have the same axial length (i.e., $L_1 = L_2$), then the product of "$C_d L$" cancels in the above equation because $C_d$ is a constant. If $P_s = 1000$ psi and $R = 0$, as in the first embodiment, then the above equation can be solved for $P_1$:

$$P_1 = 1000 A_1 / (A_1 + A_2)$$

Assume that these orifices have the same nominal area (i.e., $A_{1n} = A_{2n}$) when the shaft is positioned concentrically. Because the areas of these orifices vary reciprocally when the shaft moves either upwardly or downwardly, $$A_1 = A_{1n} + wx$$

$$A_2 = A_{2n} - wx$$

where w is the circumferential width of each orifice and x is the radial displacement of the shaft axis from its concentric position, as in the prior art embodiment. According to the previously used sign convention, x will be positive if the shaft moves downwardly from its concentric position, but will be negative if the shaft moves upwardly from its concentric position. For comparison purposes, assume that $A_{1n} = A_{2n} = 0.000314$ in$^2$, as before, and that each orifice has a circumferential width (w) of 0.628 inches and a nominal height (h) of 0.0005 inches. Thus, $P_1$ may be again expressed as a function of x:

$$P_1 = (0.314 + 628x)/0.000628$$

The flow (Q) through the improved bearing may be calculated according to the equation:

$$Q = Q_2 = A_2 C_d L_2 (P_1 - R)$$

But since $A_2 = A_{2n} - 0.628x$, $C_d = 0.587$ in$^2$/sec lb., $L_2 = 1.0$ in and $R = 0$, this equation may be simplified to:

$$Q = (0.000314 - 0.628x)(0.587)(1.0)P_1$$

The values of $P_1$ and Q, for various values of x, are summarized in Table II herebelow:

TABLE II

| Improved Bearing (FIGS. 2a–2c) | | |
|---|---|---|
| x (in) | $P_1$ (psi) | Q (in$^3$/sec) |
| −0.0005 | 0 | 0 |
| −0.0004 | 100 | 0.033 |
| −0.0003 | 200 | 0.059 |
| −0.0002 | 300 | 0.077 |
| −0.0001 | 400 | 0.088 |
| 0 | 500 | 0.092 |
| +0.0001 | 600 | 0.088 |
| +0.0002 | 700 | 0.077 |
| +0.0003 | 800 | 0.059 |
| +0.0004 | 900 | 0.033 |
| +0.0005 | 1000 | 0 |

The dimensionless analogs of this data is also plotted in FIG. 3. From this, it can be seen that as the shaft moves radially downwardly from x = −0.005 to x = +0.005, so that the area of the inlet orifice increases while the area of the outlet orifice correspondingly decreases, $P_1$ progressively increases substantially linearly. However, whereas the flow through the prior art bearing continually decreased as the shaft moved downwardly from x = −0.0005 in to x = +0.0005 in, the flow through the new bearing is at its maximum when the shaft axis is concentric, but decreases when the shaft moves either upwardly or downwardly from such concentric position. Moreover, whereas the flow through the prior art bearing was at its maximum (i.e., Q = 0.123 in$^3$/sec) at x = −0.0005 in, the flow through the improved bearing is substantially zero at this same eccentric displacement. At the same time, when the shaft axis is in the concentric position, $P_1$ and Q will be the same (i.e., $P_1 = 500$ psi and Q = 0.092 in$^3$/sec) in the improved bearing as in the prior art bearing. Thus, in both cases, the pressure drops (i.e., $P_s - P_1$ and $P_1 - R$) across the inlet and outlet orifices will be the same when the shaft is in its concentric position.

The second embodiment (FIGS. 4a–4b) and third embodiment (FIGS. 5a–5c) are shown to illustrate other possible forms of the improved bearing.

Figure 4A:
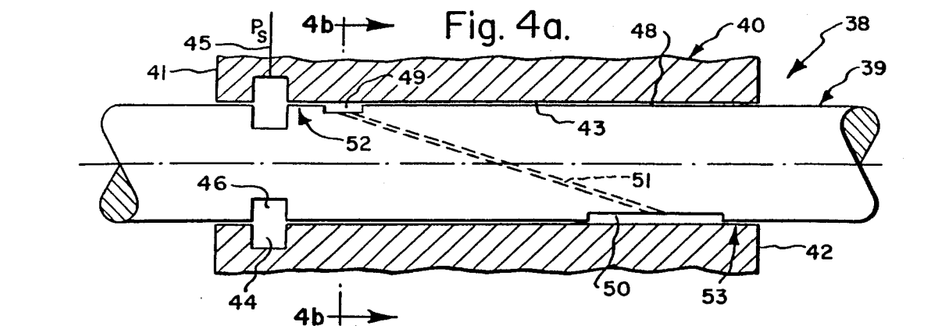
FIG. 4a is a schematic fragmentary vertical sectional view of a second form of the improved bearing, in which the sensing and bearing pads are alternatively provided in the rod.
Figure 4B:
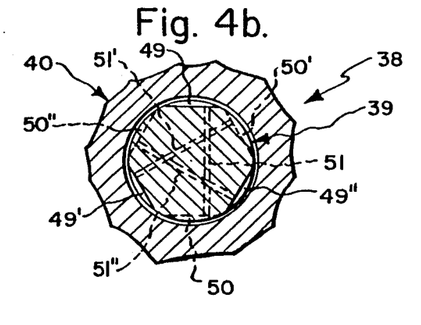

SECOND EMBODIMENT (FIGS. 4a–4b)

Referring now to FIGS. 4a and 4b, this second embodiment of the improved bearing, generally indicated at 38, is shown as being provided between a rotatable shaft 39 which penetrates a body 40. Shaft 39 is also mounted for some limited axial movement relative to the body.

Body 40 has a vertical left face 41, a vertical right face 42, and a horizontally-elongated through-bore extending therebetween. This through-bore is bounded by an inwardly-facing horizontal cylindrical surface 43. An annular groove 44 extends radially into the body from bore surface 43, and communicates with a source of pressurized fluid at supply pressure $P_s$ via passageway 45.

An annular groove 46 extends radially into shaft 39 from its outwardly-facing cylindrical surface 48 so as to be aligned with body groove 44. As best shown in FIG. 4b, three radially-aligned transverse flats are milled into the shaft from cylindrical surface 48 to form three sensing pads 49,49′,49″ spaced equally about the shaft. The axial lengths and arc distances of these three sensing pads are the same. Each sensing pad is spaced rightwardly from shaft groove 46 by an axial distance $L_1$.

Three other radially-aligned transverse flats are milled into the shaft adjacent body end wall 42 to form bearing pads 50,50′,50″ spaced equally about the shaft. The arc distances occupied by the bearing pads are shown as being the same as the arc distances occupied by the sensing pads. In other words, in the disclosed embodiment, the sensing and bearing pads each occupy the same circumferential width. However, each bearing pad is shown as having an axial length which is greater than the length of the associated sensing pad. Hence, the upwardly-facing projected area of each sensing pad 49 is less than the downwardly-facing projected area of its paired bearing pad 50. The various pairs of diametrically-opposite sensing pads 49,49′,49″ and bearing pads 50,50′,50″ communicate with one another via passageways 51,51′,51″ provided in the shaft. The bearing pad is spaced leftwardly from body wall 42, which faces into a chamber communicating with the fluid return at a return pressure R, by a distance $L_2$.

Thus, the variable-area inlet orifice, generally indicated at 52, is formed between facing cylindrical surfaces 43,48 and extends between shaft groove 46 and sensing pad 49. The variable-area outlet orifice, generally indicated at 53 is formed between facing cylindrical surfaces 43,48 and extends between bearing pad 50 and body right wall 42. The fluid in groove 46 is at supply pressure $P_s$. Such fluid may flow from groove 46 through inlet orifice 52, sensing pad 49, passageway 51, bearing groove 50, and outlet orifice 53 to return. Of course, fluid may also flow through similar paths for the other two pairs of flow passages as well. As in the first embodiment, the areas of the paired inlet and outlet orifices vary reciprocally in the sense that as the area of one increases, the other decreases by a corresponding amount.

Thus, the principle difference between the first and second embodiment lies in structure, not operation. In the first form, the sensing and bearing pads, as well as the passageways, were provided in the body. In the second form, these pads and passageways are provided in the shaft.

Figure 5A:
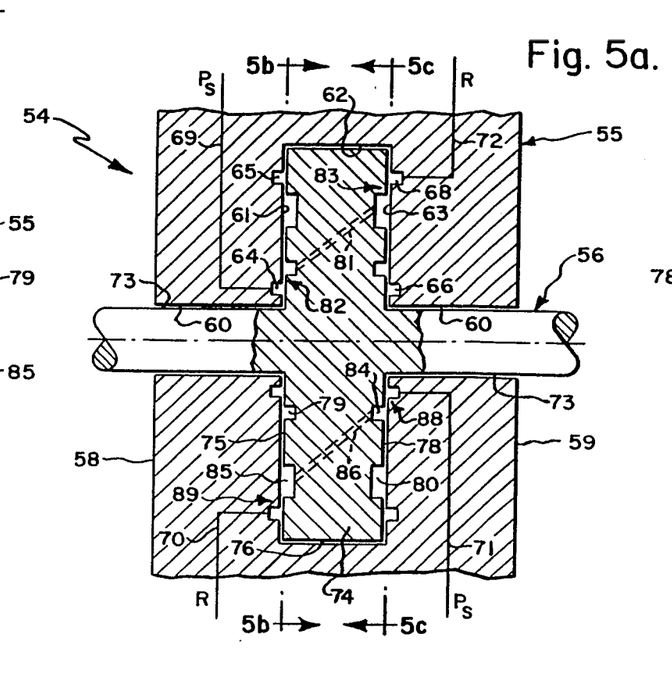
FIG. 5a is a schematic fragmentary vertical sectional view of a third form of the improved bearing, this embodiment being a thrust bearing also permitting relative rotation between the two members.
Figure 5B:
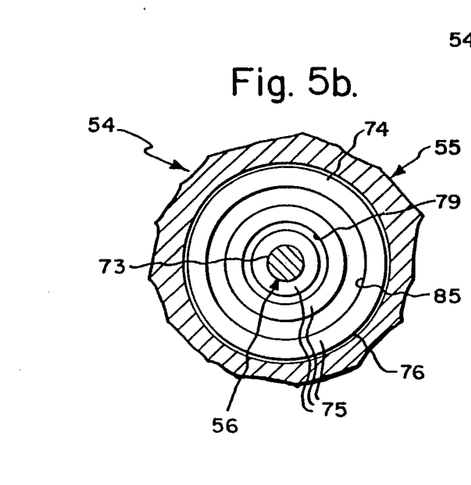
FIG. 5b is a fragmentary transverse vertical sectional view thereof, taken generally on line 5b—5b of FIG. 5a, and showing the left end face of the rod flange in elevation.
Figure 5C:
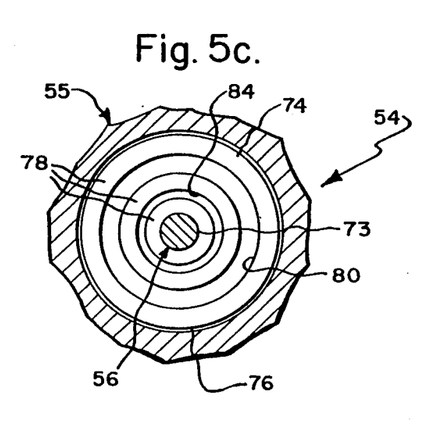
FIG. 5c is a fragmentary transverse vertical sectional view thereof, taken generally on line 5c—5c of FIG. 5a, and showing the right end face of the rod flange in elevation.

THIRD EMBODIMENT (FIGS. 5a–5c)

The third form, generally indicated at 54, illustrates the principles of the invention as applied to an axial thrust bearing. Bearing 54 has a body 55 and a shaft 56.

Body 55 has a vertical left face 58, a vertical right face 59, and a stepped horizontal through-bore extending therebetween. This bore includes an inwardly-facing horizontal cylindrical surface 60. A deep annular recess extends radially into the body from a central portion of surface 56. This recess is bounded by a rightwardly-facing annular vertical left wall 61, an inwardly-facing horizontal cylindrical surface 62, and a leftwardly-facing annular vertical right wall 63. Two radially-spaced annular grooves 64,65 extend leftwardly into the body from recess left wall 61, and two opposite radially-spaced annular grooves 66,68 extend rightwardly into the body from recess right wall 63. Left inner recess 64 communicates via passageway 69 with a source of pressurized fluid at a supply pressure $P_s$. Left outer recess 65 communicates via conduit 70 with a fluid return at a return pressure R. Conversely, right inner recess 66 communicates via passageway 71 with the fluid source, and right outer recess 68 communicates via passageway 72 with the fluid return.

Shaft 56 is depicted as having a horizontally-elongated portion, bounded by outwardly-facing horizontal cylindrical surface 73, from which a flange 74 extends radially outwardly so as to be operatively arranged within the body recess. Specifically, this flange is defined by a leftwardly-facing annular vertical surface 75 arranged in closely-spaced facing relation to recess surface 61, an outwardly-facing horizontal cylindrical surface 76 arranged in closely-spaced facing relation to recess surface 62, and a leftwardly-facing annular vertical surface 78 arranged in closely-spaced facing relation to recess surface 63.

An annular first sensing groove 79 extends rightwardly into the flange from left face 75. Sensing groove 79 is spaced radially from fluid supply groove 64 by a distance $L_1$. An annular first bearing groove 80 extends leftwardly into the flange from right face 78. Bearing groove 80 is spaced radially from fluid return groove 68 by a distance $L_2$, which is preferably the same as distance $L_1$. A passageway 81 communicates first sensing groove 79 with first bearing groove 80. Thus, a first variable inlet orifice 82 is defined between surfaces 61,75 and extends from supply groove 64 to sensing pad 79, while a first variable outlet orifice 83 is defined between facing surfaces 63,78 and extends from bearing groove 80 to return groove 68. Thus, the paired sensing and bearing pads extend into the flange from opposing surfaces thereof.

An annular second sensing groove 84 extends leftwardly into the flange from right surface 78. Sensing groove 84 is spaced radially from fluid supply groove 66 by a distance $L_3$. An annular second bearing groove 85 extends rightwardly into the flange from left surface 75. Bearing groove 85 is spaced radially from fludi return groove 65 by a distance $L_2$, which is preferably the same as distance $L_3$. In the preferred embodiment, which is symmetrical, $L_1=L_2=L_3=L_4$. A passageway 86 communicates second sensing groove 84 with second bearing groove 85. Thus, a second variable inlet orifice 88 is defined between facing surfaces 61,78 and extends from supply groove 66 to sensing groove 84, while a second variable outlet orifice 89 is defined between facing surfaces 61,75 and extends from bearing pad 85 to return groove 65.

Here again, bearing 54 is configured such that when the flange is in an axially-centered position relative to the body and recess, the pressure drops across all four variable orifices 82,83,88,89 will be substantially the same.

However, if the shaft moves rightwardly relative to the body, the pressure drop across first inlet orifice 82 will decrease, and the pressure drop across first outlet orifice 83 will increase. Hence, the pressure in first pads 79,80 will increase to exert an increased net leftward force on the flange, which urges the shaft to move relative to the body back to its original centered position. At the same time, the pressure drop across second inlet orifice 88 will increase, while the pressure drop across second outlet orifice 89 will decrease. Hence, the pressure in the second pads and passageway will decrease, to permit such leftward recentering movement of the shaft and flange.

If the shaft were to move leftwardly relative to the body, the above described operational sequence would be reversed. Moreover, as previously noted, bearing 54 is configured such as a thrust bearing to resist axial loads applied to shaft 56, but still permits rotational movement of the shaft relative to the body.

MODIFICATIONS

Three diverse and varied embodiments of the improved bearing have been illustrated to demonstrate the breadth of this invention. The improved bearing may be operatively provided between two members which are movable axially and/or rotatively relative to one another. As has been demonstrated, the paired sensing and bearing pads may be provided in either member. The communicating passageway need not necessarily be in the same member as that which is provided with the bearing and sensing pads.

The orifices may be configured identically so that the pressure drop across each will be the same when the shaft or member is in its centered position. However, this need not invariably obtain. For example, the length of a particular orifice may be increased if its width is decreased so that the product therebetween will be substantially equal to the product of these same variables for another like orifice.

If the direction of the applied loading is invariable, a minimum of one pair of orifices may be used. However, such is infrequently the case, and it is generally preferred to employ multiple orifice pairs, particularly between a rod or shaft and an encircling body. The return pressure need not necessarily be zero. The invention is believed to be capable of a myriad of other forms and variations too numerous to be mentioned. In the foregoing description, only the flow passages of least resistance have been described. Persons skilled in this art will appreciate that the leakage between the other facing surfaces will be minimal.

Therefore, while three preferred embodiments of the invention have been shown and described, and several modifications thereof discussed, persons skilled in this art will readily appreciate that various additional changes and modifications may be made without departing from the spirit of the invention, as defined and differentiated by the following claims.

What is claimed is:

1. A hydrostatic bearing operatively arranged between relatively-movable first and second members, wherein the improvement comprises:
   a sensing pad extending into one of said members and arranged to face the other of said members;
   a bearing pad extending into said one member at a location opposed to the location of said sensing pad and arranged to face said other member, the projected area of said bearing pad being greater than the projected area of said sensing pad;
   a passageway communicating said sensing and bearing pads so as to equalize the pressures therein;
   a fluid source at a relatively-high supply pressure;
   a fluid return at a relatively-low return pressure;
   a variable inlet orifice defined between said members and extending from said source to said sensing pad;
   a variable outlet orifice defined between said members and extending from said bearing pad to said return;
   said orifices being so dimensioned and proportioned such that when said first member is in a predetermined position relative to said second member, the pressure drop across said inlet orifice will be substantially equal to the pressure drop across said outlet orifice;
   whereby, if said first member moves from said predetermined position toward said second member such that the spacing between said sensing pad and said other member decreases, the pressure in said pads and passageway will increase to exert an increased net force which urges said first member to move back toward said predetermined position.

2. The improvement as set forth in claim 1 wherein said second member has an inwardly-facing cylindrical surface, and wherein said first member has an outwardly-facing cylindrical surface arranged to face said second member cylindrical surface.

3. The improvement as set forth in claim 2 wherein said first member is mounted for axial movement relative to said second member.

4. The improvement as set forth in claim 2 wherein said first member is mounted for rotational movement relative to said second member.

5. The improvement as set forth in claim 4 wherein said first member is mounted for axial movement relative to said second member.

6. The improvement as set forth in claim 2 wherein said bearing pad is arranged at a location diametrically opposite the location of said sensing pad.

7. The improvement as set forth in claim 2 wherein said bearing pad is spaced axially from said sensing pad.

8. The improvement as set forth in claim 2 wherein the circumferential width of said bearing pad is substantially equal to the circumferential width of said sensing pad.

9. The improvement as set forth in claim 8 wherein the axial length of said bearing pad is greater than the axial length of said sensing pad.

10. The improvement as set forth in claim 2 wherein said sensing and bearing pads extend into said second member from its cylindrical surface.

11. The improvement as set forth in claim 10 wherein said second member has an annular first surface spaced from and facing away from said sensing pad, wherein supply pressure acts against said first surface, and wherein said inlet orifice extends between said facing cylindrical surfaces from said first surface to said sensing pad.

12. The improvement as set forth in claim 11 wherein said first surface is an end face of said second member.

13. The improvement as set forth in claim 10 wherein said second member has an annular second surface spaced from and facing away from said bearing pad, wherein return pressure acts against said second surface, and wherein said outlet orifice extends between said cylindrical surfaces from said sensing pad to said second surface.

14. The improvement as set forth in claim 13 wherein the axial length of said outlet orifice is substantially equal to the axial length of said inlet orifice.

15. The improvement as set forth in claim 13 wherein said second surface is an end face of said second member.

16. The improvement as set forth in claim 10 wherein said passageway is provided in said second member.

17. The improvement as set forth in claim 2 wherein said sensing and bearing pads extend into said first member from its cylindrical surface.

18. The improvement as set forth in claim 17 wherein said first member has an annular first surface spaced from and facing away from said sensing pad, wherein supply pressure acts against said first surface, and wherein said inlet orifice extends between said facing cylindrical surfaces from said first surface to said sensing pad.

19. The improvement as set forth in claim 18 wherein said first surface is provided by a groove extending into said first member from its cylindrical surface.

20. The improvement as set forth in claim 17 wherein said first member has an annular second surface spaced from and facing away from said bearing pad, wherein return pressure acts against said second surface, and wherein said outlet orifice extends between said cylindrical surfaces from said sensing pad to said second surface.

21. The improvement as set forth in claim 20 wherein the axial length of said outlet orifice is substantially equal to the axial length of said inlet orifice.

22. The improvement as set forth in claim 20 wherein said passageway is provided in said first member.

23. The improvement as set forth in claim 2 wherein said cylindrical surfaces are concentric when said members are in said predetermined relative position.

24. The improvement as set forth in claim 23 wherein the flow through said passageway decreases when said first member moves eccentrically to decrease the radial spacing between said sensing pad and said other member cylindrical surface.

25. The improvement as set forth in claim 23 wherein the flow through said passageway decreases when said first member moves eccentrically to increase the radial spacing between said sensing pad and said other member cylindrical surface.

26. The improvement as set forth in claim 1 wherein said second member ha sfirst and second surfaces arranged in spaced facing relation, wherein said first member has a first surface arranged in spaced facing relation to said second member first surface, and wherein said first member has a second surface arranged in spaced facing relation to said second member second surface.

27. The improvement as set forth in claim 26 wherein said first member is movable in one direction relative to said second member such that the spacing between said first surfaces will decrease, and the spacing between said second surfaces will increase.

28. The improvement as set forth in claim 27 wherein said first member is movable in the opposite direction relative to said second member such that the spacing between said first surfaces will increase, and the spacing between said second surfaces will decrease.

29. The improvement as set forth in claim 28 wherein said one direction is axially of said first member.

30. The improvement as set forth in claim 26 wherein said sensing pad extends into said first member from its first surface, and wherein said bearing pad extends into said first member from its second surface.

31. The improvement as set forth in claim 30 wherein said passageway is provided in said first member.

32. The improvement as set forth in claim 31 wherein said second member has a fourth surface against which return pressure acts, and wherein said outlet orifice is provided between said facing second surfaces from said bearing pad to said fourth surface.

33. The improvement as set forth in claim 31 wherein the flow through said passageway decreases when said members move from said predetermined position to decrease the spacing between said first surfaces.

34. The improvement as set forth in claim 31 wherein the flow through said passageway decreases when said members move from said predetermined position to increase the spacing between said first surfaces.

35. The improvement as set forth in claim 30 wherein said sensing pad is an annular groove, and wherein said bearing pad is an annular groove.

36. The improvement as set forth in claim 30 wherein said second member has a third surface against which supply pressure acts, and wherein said inlet orifice is provided between said facing first surfaces from said third surface to said sensing pad.

* * * * *